United States Patent
Mitra

(10) Patent No.: US 7,774,622 B2
(45) Date of Patent: Aug. 10, 2010

(54) CRPTO ENVELOPE AROUND A CPU WITH DRAM FOR IMAGE PROTECTION

(75) Inventor: Somnath Mitra, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 11/557,033

(22) Filed: Nov. 6, 2006

(65) Prior Publication Data
US 2008/0109660 A1    May 8, 2008

(51) Int. Cl.
G06F 12/14    (2006.01)
G06F 13/00    (2006.01)

(52) U.S. Cl. ........................ 713/193; 713/189; 713/190; 711/163; 711/164

(58) Field of Classification Search ......... 713/189–194; 711/163–164
See application file for complete search history.

(56) References Cited

U.S. PATENT DOCUMENTS 6,523,118 B1 *    2/2003    Buer ........................... 713/189

2006/0047972 A1 *    3/2006    Morais ........................ 713/190

OTHER PUBLICATIONS

AES, Bus, Memory Management, Memory Management Unit, Register. In Microsoft Computer Dictionary. Microsoft Press 2002.*
Schneier, Bruce. Applied Cryptography: Protocols, Algorithms, and Source Code in C. 2nd. New York: John Wiley & Sons, Inc., 1996. Print.*
"The Fast 8051 Microcontroller: Leading the Way in Growth and Innovation", Application Note 2035, [Internet] http:www.maxim-ic.com/an2035, Maxim Integrated Products, May 14, 2003, 8 pages, Dallas, Texas.

* cited by examiner

Primary Examiner—Kambiz Zand
Assistant Examiner—Imhotep Durham
(74) Attorney, Agent, or Firm—Brinks, Hofer, Gilson & Lione

(57) ABSTRACT

In one embodiment, a Central Processing Unit having a processing core. The processing core connects to an internal memory bus having N address lines and X data lines. A cache connects to the internal memory bus and uses M of N bits of the N address lines to address data stored in the cache. A cryptographic unit in the CPU encrypts data written to an external memory and decrypts data read from the external memory. The cryptographic unit encrypts and decrypts N-M address lines of the internal memory bus and the data lines of the bus.

17 Claims, 2 Drawing Sheets

CRPTO ENVELOPE AROUND A CPU WITH DRAM FOR IMAGE PROTECTION

FIELD OF THE INVENTION

This disclosure relates to a Central Processing Unit.

PRIOR ART

Makers of chips and other digital processing devices are constantly striving to protect the software and firmware applications executed by the Central Processing Unit (CPU) on the chip or in the device. One point of attack of those that desire to read or reverse engineer this software and/or firmware is the CPU. One reason a CPU is vulnerable is that signal interfaces of the CPU are published. This allows one desiring to retrieve the software and/or firmware to monitor code flow in the CPU. The code flow can then be used to reverse engineer the code.

In the past, designers of processing units have tried to use signatures and signature checking to authenticate data retrieved from the volatile memory. However, if the code flow is monitored, the code may be reverse engineered and a patch may be inserted that bypasses signature checking code modules. Thus, the use of signatures is not an effective security system for a CPU.

A second method for protecting the data in the CPU is placing a cryptographic unit between a processing core in the CPU and an external memory. The cryptographic unit encrypts data being written to memory and decrypts data that is read from the external memory. This greatly increases the security of the CPU. However, the use of cryptographic units greatly degrades system performance.

One problem that degrades performance is the use of a cache in the CPU. This is because during a write operation to a part of a cache line, data in the cache must be read, encrypted, and then written to memory. This is commonly referred to as a Read-Modify-Write cycle. In order to prevent these problems, the cache size must be greatly increased and the minimum size of a data write operation must be maintained to reduce the degradation caused by write operations. For these reasons, those skilled in the art are constantly striving to provide an effective system for placing a cryptographic unit between a processing core and an external memory.

Modern microprocessor based systems use vast quantities of Dynamic Random Access Memory (DRAM). Prior art applications of cryptographic units to DRAM based systems reduces the performance of a DRAM drastically. A DRAM may be optimized for burst access. The prior art encryption of address lines used with a Static Random Access Memory (SRAM) system increases the number of page open/close operations in a DRAM to such levels that the memory access latency is increased enough to make the system unusable. Thus, a system using DRAM cannot use prior art encryption systems.

DESCRIPTION OF EXAMPLE EMBODIMENTS

Overview

Figure 1:
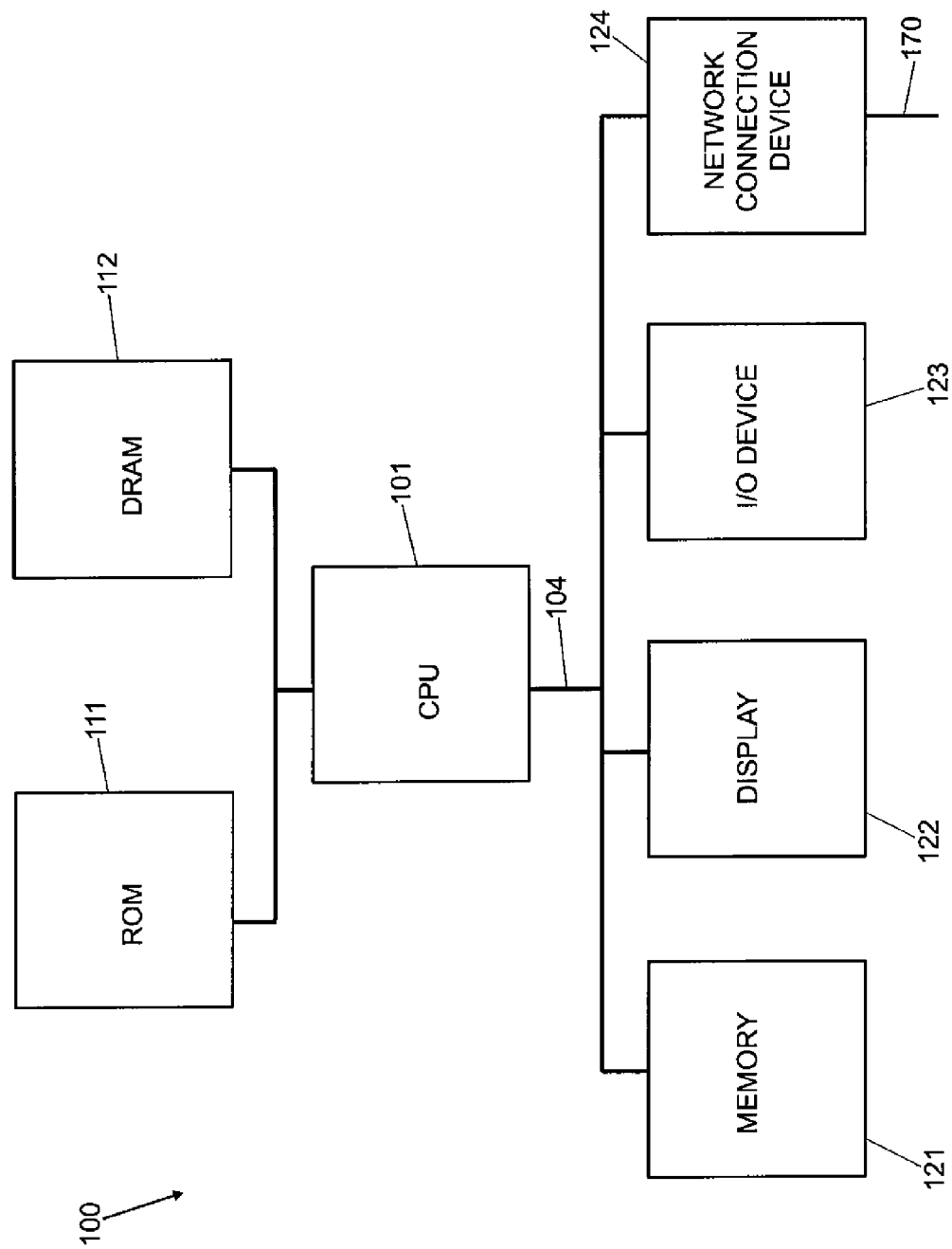
FIG. 1 illustrates a block diagram of a digital processing system that includes a Central Processing Unit having a cryptographic unit in accordance with this invention.

This disclosure relates to a Central Processing Unit (CPU) that includes a cryptographic unit between a processing core and an external memory, specifically a DRAM. The cryptographic unit is connected to the memory bus of the CPU between a memory cache and the external memory. In accordance with this invention, the memory bus has N lines and the cache uses M least significant bits of the N lines to address the cache. Thus, the cryptographic unit encrypts the N-M significant bits of the address lines and the lines of the data bus to reduce the system degradation of burst reads. These and other advantages and features of this invention are shown in the following drawings. Where appropriate, reference numerals of a component shown in different figures are the same.

FIG. 1 illustrates a block diagram of components of a digital processing system 100 including a CPU 101 in accordance with this invention. Processing system 200 has a Central Processing Unit (CPU) 101. CPU 101 is a processor, microprocessor, or any combination of processors and/or microprocessors that execute instructions stored in memory to perform an application. CPU 101 is connected to a memory bus 203 and Input/Output (I/O) bus 104.

A non-volatile memory such as Read Only Memory (ROM) 111 is connected to CPU 101 via memory bus 103. ROM 111 stores instructions for initialization and other systems command of processing system 100. One skilled in the art will recognize that any memory that cannot be written to by CPU 101 may be used for the functions of ROM 111.

A volatile memory such as Dynamic Random Access Memory (DRAM) 112 is also connected to CPU 101 via memory bus 103. DRAM 112 stores instructions for all processes being executed and data operated upon by the executed processes. One skilled in the art will recognize that other types of memories such as SRAM may also be used as a volatile memory and that memory caches and other memory devices (not shown) may be connected to memory bus 104.

Peripheral devices including, but not limited to, memory 121, display 122, I/O device 123, and network connection device 124 that are connected to CPU 101 via I/O bus 104. I/O bus 104 carries data between the device and CPU 101. Memory 101 is a device for storing data into a media. Some examples of memory 121 include flash memory and Static RAM (SRAM). Display 122 is a monitor or display and associated drivers that convert data to a display. I/O device 123 is a keyboard, a pointing device or other device that may be used by a user to input data. Network device 124 is a modem or Ethernet controller that connects processing system 100 to a network 170.

Figure 2:
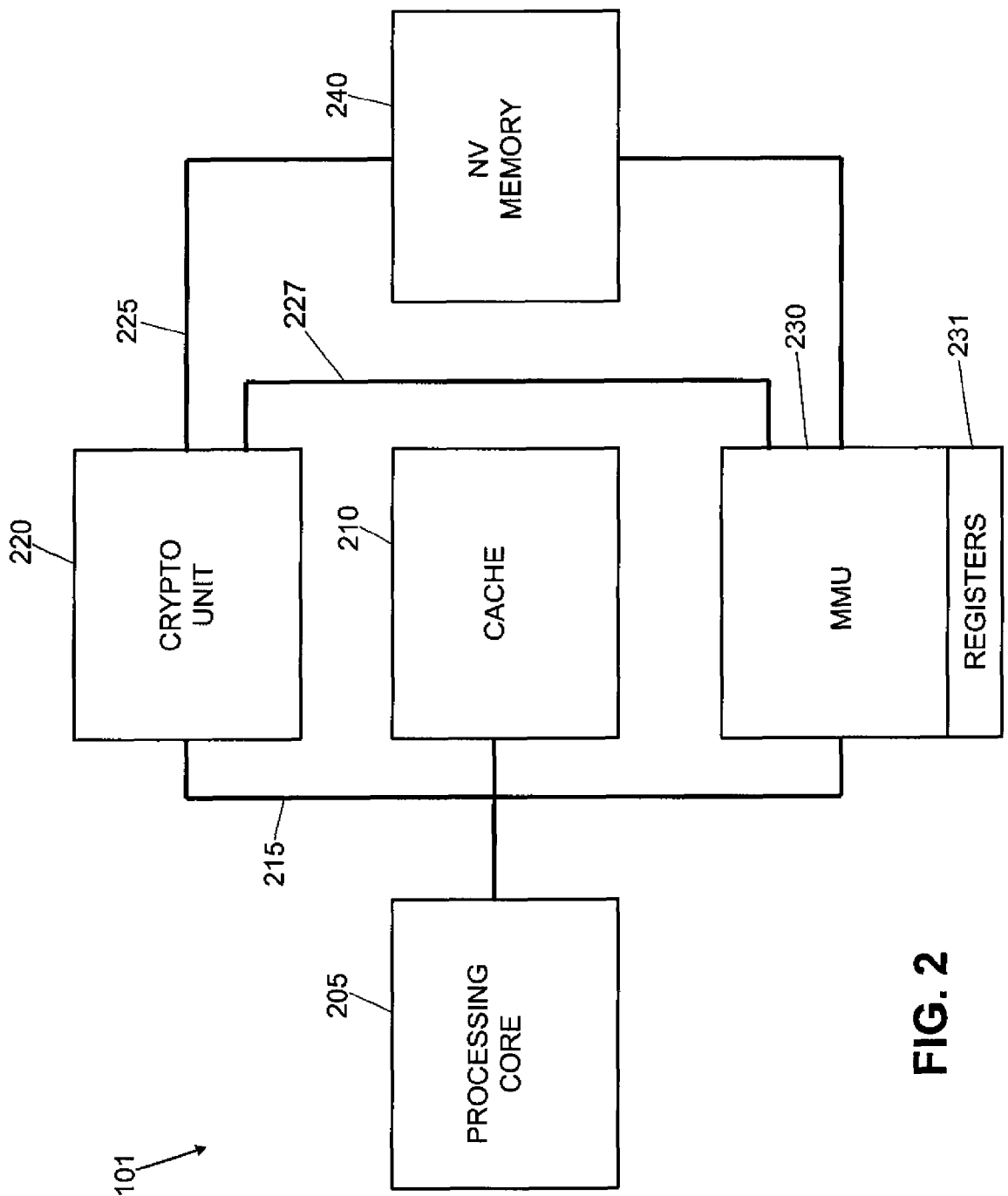
FIG. 2 illustrates a block diagram of a Central Processing Unit having a cryptographic unit in accordance with this invention.

FIG. 2 illustrates CPU 101 including a cryptographic system in accordance with this invention. One skilled in the art will recognize that only the components of CPU 101 necessary to practice this invention are shown and described. Other components of CPU 101 are omitted for brevity.

In accordance with an embodiment of this invention, CPU 101 includes processing core 205, cache 210, non-volatile memory 240, cryptographic unit 220 and memory management unit 230. Processing core 205 includes all circuitry necessary for CPU 101 to execute instructions stored in memory to process data. For purposes of this discussion, the exact configuration is not necessary for understanding the invention and is omitted for brevity. Processing core 105 connects memory management unit 230, cache 210 and cryptography unit 220 via internal memory bus 215. Internal memory bus 215 includes N address lines to carry an N-bit address and X data lines. In this embodiment, internal memory bus has 32 address lines to support 32-bit addressing and 256 data lines from transmitting 256 bits or 32 bytes of data (a typical cache line size).

Cache 210 is a conventional on-chip memory for storing recently used data to increase the processing speed in CPU 101. Generally, the cache only uses the M least significant bits of a memory address to store data for each cache line. However, one skilled in the art will recognize that any M-bits from the address are used. In this embodiment, cache 210 stores 32 byte words per cache line. Thus, using binary addressing, M is equal to 5. In this embodiment, the 5 least significant bits of an address are used to store the data in cache 210. In order to prevent excessive row open and closes in DRAM, cache 210 should be large enough to store enough data to reduce the amount of row opens needed. By not encrypting the M least significant bits, the DRAM controller inside the CPU can continue providing burst accesses.

For purposes of this discussion, a row open command is a command to charge a row of a bank in the memory to which data may be read and written. A row close is removing the charge from a row in a bank of memory to prevent data from being read and written from the memory. In order for a row to be open, a pre-charge must take place. The pre-charge takes a significant amount of clock cycles to be completed (typically 14 clock cycles compares to 0.5 clock cycles for DDR data burst access.) Thus, cache 210 should be large enough that the blocks of the cache may store a row of data from the memory in order to eliminate the number pre-charges needed which degrade system performance by causing the rest of the system to be relatively idle while waiting for the read/write operation to be completed.

Cryptographic unit 220 is module that includes circuitry for encrypting and decrypting data as is common in the art. Cryptographic unit 220 is connected to non-volatile memory 240 via path 225. Although not necessary in some embodiments, non-volatile memory 240 stores the keys for encrypting and decrypting data. If there is more than one memory or areas of memory connected to memory bus 103, non-volatile memory may store more than one set of keys. Each set of keys is used to encrypt and decrypt data and address for one area of memory denoted by a specific range of addresses. In some embodiments, non-volatile memory 240 may be a set of registers storing the set of keys necessary for ciphering and deciphering the data.

Cryptographic unit 220 receives all of the data lines and the N-M remaining address lines not used to address data in the cache 210. The N-M bits and the data are then encrypted and decrypted using the set of keys stored in non-volatile memory for the range of addresses of memory being read from and/or written to. In this embodiment, the 5 least significant bits are used to address the cache 210. Thus, the 27 most significant bits of the address bus are received by cryptographic unit 220 and are encrypted. The choice of keys to use for the cryptographic algorithm is beyond the scope of this invention. It is left to those skilled in the art to select a key length that provides the desired level of security and operates with the selected ciphering/deciphering algorithms.

Preferably, cryptographic unit 220 uses a block cipher method to encrypt and decrypt the data. Some examples of block cipher techniques include Data Encryption Standard (DES) and Triple DES (DES-3). Most block cipher algorithms require an even number of bits or exact number of bits in the block. Thus, cryptographic unit 220 may include an S-box 222 or other circuitry for generating a bit block of sufficient size to apply the block cipher algorithm to the data. In some embodiments, S-box 222 merely adds a constant padding that is stored in memory. In another embodiment, S-box 222 duplicates the N-M address bits in a data block and adds a constant padding if needed. In still other embodiments, S-box 222 applies an algorithm that expands the N-M bits into the required number of bits.

Memory management unit 230 receives the M unencrypted bits from processing core 205 via path 215 and the encrypted data and N-M address bits from cryptography unit 220 via path 227. Memory management unit 230 then reads data from and/or writes data to external memory 112. In addition to conventional memory management circuitry, memory management unit 230 includes registers 231. Registers 231 randomize the scattered encrypted addresses and map the addresses back to a range of addresses in a target memory. These registers may also be used to show whether a region shown covered by a Translation Look-aside Buffer (TLB) is encrypted. Typically, the TLB is a set of registers that store Write-through, Caching-inhibited, Memory coherency required, Guarded, and Endianness (WIMGE) attributes for a specific memory region. In addition an Encrypted bit may be added to these WIMGE attributes which may be called EWIMGE.

The above is a description of a preferred embodiment of an encryption system for a CPU in accordance with this invention. One skilled in the art will recognize that others skilled in the art can and will design alternative systems which infringe on this invention as set forth in the following claims either literally or through the Doctrine of Equivalents.

What is claimed is:

1. A system comprising:
   a processing core;
   a memory bus having N address lines and X data lines;
   a cache connected to said memory bus wherein said cache uses M of N bits to address data stored in said cache; and
   a cryptographic unit for encrypting data written to an external memory and decrypting data read from said external memory wherein said cryptographic unit encrypts and decrypts N-M address lines of said memory bus, wherein said cryptographic unit uses a block cipher to encrypt and decrypt data, and wherein said block cipher requires O bits where O is greater than N.

2. The system in claim 1 further comprising: a register in a memory management unit that indicates that a translation look-aside buffer covers a region of said memory.

3. The system of claim 2 further comprising: an encryption bit in said translation look-aside buffer that indicates whether a region is encrypted.

4. The system of claim 1 further comprising: circuitry configured to duplicate said N bits of said address to create a bit block of O bits.

5. The system of claim 1 wherein said circuitry configured to duplicate further comprises: circuitry configured to add padding to said duplicate of said N-bits to generate said bit block of O bits.

6. The system of claim 1 further comprising: an S-box for generating an O-bit block from said N-bit address.

7. The system of claim 1 further comprising: circuitry configured to add a constant padding to said N-bit address to make an O-bit block.

8. The system of claim 1 further comprising: a memory management unit connected to said memory bus between said cryptographic unit and said external memory wherein said memory management unit includes a plurality of registers which randomize address bits and map said bits to said external memory.

9. A method comprising: receiving data being written to an external memory over an internal memory bus having N address lines and X data lines wherein a cache connected to said internal memory bus uses M of N bits to address data stored in said cache; and encrypting said data received over said X data lines and only N-M address lines of said internal memory bus, wherein said step of encryption uses a block cipher to encrypt said data, and wherein said block cipher requires O bits where O is greater than N.

10. The method of claim 9 further comprising: determining whether said address is in an area of memory that has a Translation Look-aside buffer.

11. The method of claim 10 further comprising: setting an encryption bit in said translation look-aside buffer to indicate said area of memory includes encrypted data.

12. The method of claim 9 further comprising duplicating said N bits of said address to create a bit block of O bits for encryption.

13. The method of claim 9 wherein said step of duplicating further comprises: adding padding to said duplicate of said N-bits to generate said bit block of O bits.

14. The method of claim 9 further comprising: generating an O-bit block from said N-bit address.

15. The method of claim 9 further comprising: adding a constant padding to said N-bit address to make an O-bit block.

16. The method of claim 9 further comprising: randomizing said address bits; and mapping said address bits to said external memory.

17. An apparatus comprising:
N address lines and X data lines;
a cache connected to said memory bus wherein said cache uses M of N bits to address data stored in said cache; and
means for encrypting and decrypting data transmitted over an internal memory bus having N address lines and X data lines to and from an external memory and decrypting data read from said external memory wherein said cache uses M of N bits to address data stored in said cache and data over only N-M address lines and said data line of said internal memory bus are encrypted and decrypted, wherein said means for encrypting and decrypting data uses a block cipher including O bits where O is greater than N.

* * * * *